United States Patent [19]

Yaggi, Jr.

[11] 4,189,408

[45] Feb. 19, 1980

[54] CHLORINATED HYDROCARBONS AND IMPROVED RUBBER SEALANT COMPOSITIONS INCORPORATING SAME

[75] Inventor: Cyril J. Yaggi, Jr., Pittsburgh, Pa.

[73] Assignee: Neville Chemical Company, Pittsburgh, Pa.

[21] Appl. No.: 858,831

[22] Filed: Dec. 8, 1977

Related U.S. Application Data

[63] Continuation-in-part of Ser. No. 734,039, Oct. 20, 1976.

[51] Int. Cl.$^2$ .............................................. C08L 91/00
[52] U.S. Cl. .......................... 260/18 R; 260/33.8 R; 260/37 R
[58] Field of Search ................ 260/33.8 R, 660, 18 R

[56] References Cited

U.S. PATENT DOCUMENTS

| | | | |
|---|---|---|---|
| 3,567,610 | 3/1971 | Krol et al. | 260/660 X |
| 3,896,183 | 7/1975 | Henderson et al. | 260/660 |
| 3,919,338 | 11/1975 | Henderson et al. | 260/660 |

Primary Examiner—Lewis T. Jacobs
Attorney, Agent, or Firm—Burns, Doane, Swecker & Mathis

[57] ABSTRACT

An improved chlorinated hydrocarbon is provided which is uniquely compatible with polysulfide rubber sealant formulations when incorporated as a plasticizer therein. Certain paraffins or alpha-olefins and blends thereof when chlorinated to selected final chlorine contents are compatible with polysulfide rubber sealant formulations while still maintaining the necessary low viscosity and volatility when incorporated as a plasticizer therein. The improved plasticizers are not subject to significant heat loss. Modified polysulfide rubber sealant formulations are disclosed which incorporate as a plasticizer the improved chlorinated hydrocarbon, and which are useful as glass or window sealants, particularly as glass or window sealants between the panes of a thermal pane or multi-pane insulating window structure. The improved plasticizers are non-fogging in polysulfide rubber formulations and are not subject to significant heat loss.

24 Claims, No Drawings

CHLORINATED HYDROCARBONS AND IMPROVED RUBBER SEALANT COMPOSITIONS INCORPORATING SAME

BACKGROUND OF THE INVENTION

This application is a continuation-in-part of U.S. patent application Ser. No. 734,039, filed Oct. 20, 1976.

The use of chlorinated, aromatic hydrocarbons as modifiers and plasticizers for plastic and rubber compounds is well known. Polychlorinated biphenyls, for example, have commonly served in the past as a major source of plasticizers for polysulfide rubber sealant compositions, due to their unique compatibility with such compositions. Recently, however, it has been determined that certain of the most widely-used polychlorinated biphenyls are accumulating over long periods of time in the environment at undesirable levels. This continued presence in the environment of the polychlorinated biphenyls is due to the fact that they are relatively stable and tend not to degrade. Often, rivers and streams are polluted by dumping of polychlorinated biphenyls as chemical plant waste material. Once in the waterways, the polychlorinated biphenyls are a toxic pollutant which is very expensive to remove and highly destructive to the environment. Even when incorporated in synthetic resin compositions, for example, in a polysulfide rubber sealant formulation, the polychlorinated biphenyls are a source of environmental contamination, by way of sealant decomposition or minor plasticizer exudation.

As a result of the severe environmental hazards posed by the continued use of polychlorinated biphenyls, their manufacture and subsequent incorporation into polysulfide rubber sealant formulations has been virtually eliminated.

In recent years, increasing efforts have been directed at attempts to provide a substitute for polychlorinated biphenyls as plasticizers in plastic and rubber compositions which has the necessary compatibility so as not to exude or bleed off in any significant amount from a cured polysulfide rubber sealant composition into which it is incorporated. Such exudation causes an undesirable loss of adhesion in the rubber product. Chlorinated liquid paraffins, which are less stable than the polychlorinated biphenyls and more readily degradable, thus decreasing the possibility of environmental contamination due to long term accumulation of the contaminant, have been investigated. U.S. Pat. Nos. 3,770,678 and 3,925,331, for example, generally disclose the incorporation of a chlorinated liquid paraffin into a polysulfide rubber sealant or caulking composition, and are herein incorporated by reference.

U.S. Pat. No. 3,770,678 discloses a polysulfide latex-based composition consisting essentially of a water dispersion of a particular high-molecular weight polysulfide polymer, a particular polythiol polymer, and a special purpose additive selected from several compositions including plasticizers. Among the plasticizers mentioned therein are chlorinated biphenyls and chlorinated paraffins.

U.S. Pat. No. 3,925,331 discloses a curable sealant composition which is the reaction product of a polysulfide and a mercapto group-containing silane which may include a plasticizer and/or a filler. The plasticizer may be selected from, amongst others, chlorinated polyphenyls, nitrated aromatic compounds, phthalates and chlorinated liquid paraffins.

This prior art suffers from several serious deficiencies. First, it fails to recognize the environmental hazards of incorporating chlorinated polyphenyls as sealant composition plasticizers, as discussed in detail above. Further, many of the plasticizers contemplated by these broad teachings are too volatile to be successfully incorporated in or are incompatible with a stable polysulfide rubber sealant formulation. Further, many of those plasticizers can not be readily incorporated into polysulfide sealant formulations in amounts large enough to result in an economically priced sealant.

Japanese disclosed patent SHO-48-59151 teaches the incorporation of chlorinated paraffins as plasticizers for a liquid polysulfide composition. This prior art, like the two United States patents discussed above, fails to appreciate that such plasticizers can be too volatile to be formulated into an acceptable stable polysulfide rubber sealant composition, and/or can suffer significant heat loss, and/or can be so viscous as to be virtually unworkable and require dilution or cutting with other less viscous materials which raise volatility to unacceptable levels.

The incorporation of a chlorinated alpha-olefin containing an average of 6 to 18 carbon atoms per molecule and generally from about 20 to 73 weight percent chlorine or a chlorinated paraffin containing an average of 8 to 16 carbon atoms per molecule and generally from about 10 to 75 weight percent chlorine as a plasticizer generally for plastic and rubber compounds is also known. Particular examples include, e.g., products chlorinated to from 50 to 70 weight percent. See, for example, commonly assigned U.S. Pat. Nos. 3,896,183 and 3,919,338 which are herein incorporated by reference.

Again, there is no recognition in these patents or any of the prior art of chlorinated paraffins or alpha-olefins which are rendered compatible and non-fogging in a polysulfide rubber sealant formulation which are sufficiently low in viscosity and have acceptably low heat loss values, and which paraffins or alpha-olefins may be incorporated with a liquid polysulfide polymer to form a stable polysulfide rubber sealant formulation.

In summary, attempts to use all of these known chlorinated paraffins and alpha-olefins as plasticizers for a polysulfide rubber formulation have proved unsuccessful since these known plasticizers do not exhibit the necessary high degree of compatibility with a cured polysulfide rubber formulation while still retaining satisfactory volatility, viscosity and heat loss characteristics, and the search for a satisfactory plasticizer has continued.

It is, therefore, an object of the invention to provide an improved chlorinated hydrocarbon composition which is highly compatible with a polysulfide rubber sealant formulation while still retaining a satisfactory volatility, viscosity and heat loss value for use therein, and which is non-fogging.

It is an object of the invention to provide an improved chlorinated hydrocarbon composition which will decrease the problem of environmental contamination due to long term accumulation.

It is an object of the invention to provide a polysulfide rubber formulation which incorporates a chlorinated hydrocarbon plasticizer which will decrease the problem of environmental contamination due to long term accumulation.

It is a further object of the present invention to provide an improved polysulfide rubber formulation which incorporates a highly compatible chlorinated hydrocarbon plasticizer having a sufficiently low volatility and viscosity, the polysulfide rubber formulation not being subject to significant weight loss and the chlorinated hydrocarbon plasticizer not being subject to significant heat loss.

It is a further object of this invention to provide an improved polysulfide rubber formulation incorporating a chlorinated hydrocarbon plasticizer which decreases the problem of environmental contamination due to long term accumulation of the plasticizer in the environment, and which is useful as a glass or window sealant, particularly as a glass or window sealant between the panes of a thermal pane or multi-pane insulating window structure.

Other objects include the provision of methods for chlorinating the improved chlorinated hydrocarbon composition and for preparing the improved polysulfide rubber sealant formulation.

These and other objects and advantages of the improved chlorinated hydrocarbon composition and polysulfide rubber formulation incorporating the same, as well as their scope, nature and utilization will be apparent to those skilled in the art from the following description and appended claims.

SUMMARY OF THE INVENTION

It has been found that improved chlorinated hydrocarbon compositions consisting essentially of a chlorinated hydrocarbon selected from chlorinated paraffins or chlorinated alpha-olefins containing from 14 to about 15 carbon atoms per molecule and blends thereof, the chlorinated hydrocarbon having a chlorine content of from 50 to 59 weight percent, or a chlorinated hydrocarbon selected from chlorinated paraffins or chlorinated alpha-olefins containing from 14 to 22 carbon atoms per molecule and blends thereof, the chlorine content of the chlorinated hydrocarbon ranging from 50 to about 51 weight percent, are useful as plasticizers for polysulfide rubber sealant formulations. The improved chlorinated hydrocarbon compositions have a combination of both number of carbon atoms per molecule and chlorine content sufficient to provide a non-fogging and compatible plasticizer in such a sealant formulation, a viscosity of less than about 25,000 centipoises at 25° C. and a heat loss value of less than about 0.5 weight percent.

In another preferred embodiment of the invention, the improved chlorinated hydrocarbon to be incorporated into the polysulfide rubber sealant formulation consists essentially of a paraffin containing 15 carbon atoms per molecule, the chlorine content of the chlorinated paraffin ranging from 52 to 56 weight percent. The improved chlorinated paraffin has a viscosity of less than about 15,000 centipoises at 25° C. and has a heat loss value of less than about 0.5 weight percent.

In preferred embodiments of the invention, the improved chlorinated hydrocarbons have a viscosity of less than 10,000 centipoises at 25° C.

In another aspect of this invention, it has been found that an improved polysulfide rubber sealant formulation may be prepared comprising a liquid polysulfide polymer and a chlorinated hydrocarbon plasticizer consisting essentially of a chlorinated hydrocarbon selected from chlorinated paraffins or chlorinated alpha-olefins containing from 14 to about 15 carbon atoms per molecule and blends thereof, the chlorine content of the chlorinated hydrocarbon ranging from 50 to 59 weight percent, or a chlorinated hydrocarbon selected from chlorinated paraffins or chlorinated alpha-olefins containing from 14 to 22 carbon atoms per molecule, the chlorine content of the chlorinated hydrocarbon ranging from 50 to about 51 weight percent, results in a stable formulation when cured. The chlorinated hydrocarbon plasticizer has a combination of both number of carbon atoms per molecule and chlorine content sufficient to be non-fogging and compatible in such a sealant formulation, a viscosity of less than about 25,000 centipoises at 25° C. and a heat loss value of less than about 0.5 weight percent.

In another aspect of this invention, the improved polysulfide rubber sealant formulation includes a pigment, a retarding agent and a filler, and the formulation is cured to a stable condition by the incorporation of an effective amount of a curing agent.

In a preferred embodiment of this aspect, the sealant formulation comprises from about 10 to about 100 parts by weight of chlorinated hydrocarbon, the chlorinated hydrocarbon plasticizer having a viscosity of less than about 15,000 centipoises at 25° C., from about 0.1 to about 40 parts by weight pigment, from about 0.01 to about 1.0 parts by weight retarding agent and from about 25 to about 150 parts by weight filler per 100 parts by weight of thiol-terminated liquid polysulfide polymer. The curing agent is present in an amount from about 5 to about 12 parts by weight per 100 parts of thiol-terminated polysulfide polymer.

In another particularly preferred embodiment of this aspect, the sealant formulation comprises from about 20 to about 75 parts by weight of chlorinated hydrocarbon, from about 0.1 to about 20 parts by weight pigment, from about 0.01 to about 0.5 parts by weight stearic acid retarding agent and from about 50 to about 100 parts by weight filler per 100 parts by weight of thiol-terminated liquid polysulfide polymer. The curing agent is present in an amount from about 7 to about 10 parts by weight per 100 parts of the polysulfide polymer, and an equal amount of a carrier is present. In this aspect, the improved chlorinated hydrocarbon has a viscosity of less than about 10,000 centipoises at 25° C.

In yet another aspect, methods are provided for preparing the improved chlorinated hydrocarbon compositions and the improved polysulfide rubber sealant formulations of this invention.

One embodiment comprises chlorinating a hydrocarbon selected from paraffins or alpha-olefins containing from 14 to about 15 carbon atoms per molecule or blends thereof to a chlorine content ranging from 50 to 59 weight percent to produce an improved chlorinated hydrocarbon having a combination of carbon atoms per molecule and chlorine content sufficient to provide a non-fogging and compatible plasticizer in a polysulfide rubber sealant composition, a viscosity of less than about 25,000 centipoises at 25° C. and a heat loss value of less than about 0.5 weight percent.

In another embodiment of this aspect, the chlorinated hydrocarbon is selected from paraffins and alpha-olefins containing from 14 to 22 carbon atoms per molecule and is chlorinated to a chlorine content ranging from 50 to about 51 weight percent.

Methods are provided for preparing improved polysulfide rubber sealant formulations comprising mixing these improved chlorinated hydrocarbon compositions together with a liquid polysulfide polymer to provide a sealant formulation which is stable when cured.

Methods are also provided for curing the improved polysulfide rubber sealant formulations. The hydrocarbon is chlorinated and mixed together with a liquid polysulfide polymer, a pigment, a retarding agent and a filler and an amount of a curing agent is incorporated effective to cure the formulation.

Preferably from about 10 to about 100 parts by weight of the chlorinated hydrocarbon are mixed together with from about 0.1 to about 40 parts by weight of a pigment, from about 0.01 to about 1.0 parts by weight of a retarding agent, and from about 25 to about 150 parts by weight of a filler per 100 parts of thiol-terminated polysulfide polymer. A curing agent is incorporated in an amount from about 5 to about 12 parts by weight per 100 parts of the polysulfide polymer and effective to cure the sealant formulation.

In a particularly preferred embodiment of this aspect, from about 20 to about 75 parts by weight of the chlorinated hydrocarbon is mixed together with from about 0.1 to about 20 parts by weight of a pigment, from about 0.01 to about 0.5 parts by weight of a stearic acid retarding agent, and from about 50 to about 100 parts by weight of a filler per 100 parts by weight of a thiol-terminated polysulfide polymer. A curing agent is incorporated in an amount from about 7 to about 10 parts by weight per 100 parts of the polysulfide polymer and effective to cure the sealant formulation, and an equal amount of a carrier is present.

In yet another aspect of this invention, an improved chlorinated hydrocarbon, an improved polysulfide rubber sealant formulation incorporating the same, and methods for making both improved compositions are taught in which a composition is made which consists essentially of a blend of chlorinated hydrocarbons selected from (a) chlorinated paraffins containing 14 to about 15 carbon atoms per molecule, chlorinated alpha-olefins containing from 14 to about 15 carbon atoms per molecule, and blends thereof; and (b) chlorinated paraffins containing from about 21 to 22 carbon atoms per molecule, chlorinated alpha-olefins containing from about 21 to 22 carbon atoms per molecule, and blends thereof; the chlorine content of the improved chlorinated hydrocarbon ranging from 50 to 59 weight percent; the improved chlorinated hydrocarbon composition having a combination of (c) number of carbon atoms per molecule and (d) chlorine content sufficient to provide a non-fogging and compatible plasticizer in a polysulfide rubber sealant formulation. The improved hydorcarbons may be prepared by separately chlorinating individual streams and/or by chlorinating a blended stream. To prepare the sealant formulation, the chlorinated hydrocarbons are mixed together with a liquid polysulfide polymer, a pigment, a retarding agent and a filler to form a polysulfide rubber sealant formulation. The formulation is cured by incorporating an effective amount of a curing agent.

DESCRIPTION OF THE PREFERRED EMBODIMENTS

The hydrocarbon or hydrocarbons which are used to prepare the improved chlorinated hydrocarbon of this invention may be natural or synthetic in origin and may be liquids or solids at room temperature (i.e., ambient conditions at about 25° C.). The hydrocarbons are either paraffins or alpha-olefins. The term "paraffins" as used herein designates a class of aliphatic hydrocarbons having the general formula $C_nH_{2n+2}$, where n is greater than or equal to 1, preferably normal paraffins. Paraffins are also referred to in the art as alkanes. The term "alpha-olefins" as used herein designates a class of unsaturated aliphatic hydrocarbons having the general formula $C_nH_{2n}$, wherein n is greater than or equal to 2, and which are particularly reactive because of the presence of a double bond within the hydrocarbon molecule at a position intermediate a terminal carbon atom and the next carbon adjacent thereto. In particular, normal alpha-olefins are preferred.

The term "non-fogging" as used herein designates a particular chlorinated hydrocarbon which when incorporated into a polysulfide rubber sealant composition and placed adjacent to a clear or transparent glass surface, e.g., as when used as a sealant for window glass, does not cause the window glass to cloud over a period of time.

In particular, the term "non-fogging" refers to a chlorinated hydrocarbon which passes the following test. 75 g. of the chlorinated hydrocarbon are placed in a 38×305 mm. standard glass test tube which contains 50 ml. of about 3.2 mm. diameter glass beads. The test tube is corked with a stopper having a center hole, with a 20×150 mm. test tube snugly inserted in the hole. This test tube arrangement is inserted vertically into a silicone oil bath maintained at a temperature of about 71° C. (about 160° F.) to a level whereby the chlorinated hydrocarbon level is about 76 mm. below the bath surface. The bath is covered except for a hole through which the test tube arrangement is inserted. The smaller test tube is arranged so that its bottom end is level with the bath cover and about 51 mm. above the silicone oil level. A chlorinated hydrocarbon as defined in the appended claims is "non-fogging" if after about 24 hours (one day) of immersion in the bath, the surface of the small and large test tubes remain completely dry and clear or transparent.

After this first 24 hour period has passed and a particular chlorinated hydrocarbon has been found to be non-fogging, the bath temperature is maintained at at least about 71° C. (about 160° F.), preferably at about 77° C. (about 170° F.), and the chlorinated hydrocarbon sample is maintained at this temperature for up to three additional consecutive 24 hour (one day) periods. The samples are intermittently monitored, and if a fog test failure (i.e., a fogged surface) is observed, the test is terminated and the time of failure is recorded. Thus, a particular improved chlorinated hydrocarbon according to the present invention may be "non-fogging" after at least one day, after at least two days, after at least three days or after at least four days.

The term "compatible" as used herein designates a chlorinated hydrocarbon plasticizer which when compounded with an equal part of a liquid polysulfide polymer in the "green" or uncured state forms a clear or transparent, single-phase solution, and further, which when compounded with a liquid polysulfide polymer formulation and cured or cross-linked does not exude or bleed off from the formulation.

In particular, in the "green" compounding compatibility test, 10 ml. of the sample chlorinated paraffin is compounded with an equal volume of THIOKOL ® LP-2 polysulfide rubber in a 25×150 mm. glass test tube and the mixture is maintained at room temperature (i.e., about 25° C.) for a period of about 18 hours. A plasticizer which is "compatible" is one which, after the 18 hour period, is a visually clear or transparent solution.

Incompatibility is signified by the presence of a visually clouded solution or one which is separated into two visually distinct layers at the termination of the test.

The term "weight percent" is used herein to signify weight percent based on the total weight of a particular hydrocarbon when chlorinated unless otherwise designated.

The term "stable when cured" designates a polysulfide rubber sealant formulation which has a maximum weight loss which is not significant, i.e., less than 5.0 weight percent (based on the total weight of the chlorinated hydrocarbon plasticizer and the polysulfide polymer formulation) when heated for about 24 hours (one day) at about 70° C. according to ASTM Test Designation D 1203-67, which is herein incorporated by reference.

The term "heat loss value" as used herein refers to the weight percent of a particular chlorinated hydrocarbon which is lost when the chlorinated hydrocarbon is exposed to an elevated temperature of about 105° C. for about 24 hours according to ASTM Test Designation D2288-69 (which is herein incorporated by reference) performed without a rotating turntable.

The term "chlorinated alpha-olefin" as used herein designates an alpha-olefin which has been chlorinated.

The term "blends" as used herein designates a variety of combinations of feed hydrocarbon streams or chlorinated hydrocarbon products. Included within the term "blends" are combinations of feed streams wherein all constituents contain less than 16 carbon atoms per molecule, combinations of feed streams wherein all constituents contain more than 20 carbon atoms per molecule, combinations of feed streams wherein all constituents contain 20 or less carbon atoms per molecule, combinations of feed streams wherein all constituents contain 16 or more carbon atoms per molecule, and combinations of feed streams wherein all constituents contain between 14 and 22 carbon atoms per molecule.

Minor amounts of hydrocarbons containing as few as about 8 carbon atoms per molecule or as many as about 28 carbon atoms per molecule may be present in the feed so long as they are not present in amounts sufficient to materially affect the fundamental, basic and novel characteristics of the chlorinated hydrocarbons and sealant formulations, particularly the viscosity and volatility characteristics. Thus, minor amounts would include, e.g., less than about 0.2 weight percent of high volatility constituents such as a $C_{10}$ hydrocarbon chlorinated to about 54 weight percent, or about 0.5 weight percent of $C_{12}$ hydrocarbons chlorinated to about 55 weight percent. As the chlorine content of the various lower length hydrocarbons is decreased, even lesser amounts of these materials can be tolerated.

Minor amounts would also include, e.g., less than about 1.0 weight percent of high viscosity constituent such as $C_{26}$ or $C_{28}$ hydrocarbons chlorinated to about 55 weight percent or about 8.0 weight percent of $C_{24}$ hydrocarbons chlorinated to about 55 weight percent.

Also included in the term "blends" are similar combinations wherein the constituents are individually chlorinated prior to combining. Various chlorinated hydrocarbon streams consisting of single carbon number hydrocarbons or blends thereof may be blended after separate or independent chlorination. The particular amount of a selected chlorinated hydrocarbon is a function of several factors, e.g., chlorine content, carbon number, and other streams to be blended. Again, the main consideration or requirement is that the final blend exhibit acceptable viscosity, volatility and heat loss characteristics. This is accomplished by incorporating constituents only in amounts which would not materially affect the fundamental basic and novel characteristics of the plasticizer and sealant formulation.

When employing separately chlorinated streams, these amounts are significantly higher than when the various constituents are combined and the resulting mixture is chlorinated. In particular, low carbon number materials may be chlorinated before blending to a higher level where they do not exhibit the same degree of volatility as to same material chlorinated to the final desired chlorine content in a feed mixture. In the same manner, high carbon number materials may be chlorinated before combining to a chlorine content lower than the desired chlorine content for the final composition, thereby obtaining a material with a lower viscosity which may be combined to make the desired product.

The unchlorinated hydrocarbon from which the improved chlorinated hydrocarbon of this invention is produced must be selected so that it will be possible to obtain a sufficiently low volatility and viscosity to allow good plasticizing action, ease in handling, and long periods of satisfactory use without severe losses of adhesive properties when incorporated in a polysulfide rubber sealant formulation.

In general, if a composition is chosen which contains an excess of lower length hydrocarbons (i.e., less than 14 carbon atoms per molecule) the chlorinated composition is too volatile for incorporation into a polysulfide rubber glass or window sealant formulation as contemplated in this invention. The high volatility causes glass to fog up and become opaque under conditions of elevated temperature, e.g., in excess of 160° F., for long periods of time.

On the other hand, if a composition is selected which contains an excess of higher length hydrocarbons (i.e., more than 22 carbon atoms per molecule); the resulting product, while more satisfactory from a volatility standpoint, suffers from large increases in viscosity which render the chlorinated hydrocarbon so viscous as to make it very difficult to work with and lacking in the ease of compounding required for a glass or window sealant formulation. Further, the plasticizing effect of such a chlorinated hydrocarbon is reduced to an undesirably low level.

The improved chlorinated hydrocarbons of the present invention are chlorinated to selected final chlorine contents, and the particular combination of carbon atoms per molecule and range for chlorine content is critical to obtaining a chlorinated hydrocarbon which has the necessary compatibility, viscosity, and volatility for incorporation into a polysulfide rubber sealant formulation. Chlorinated hydrocarbons with a chlorine content below the levels set out above either do not exhibit the necessary polysulfide rubber compatibility or have a volatility which is so high as to cause extensive window fogging at elevated temperatures over a period of time. Chlorinated hydrocarbons with a chlorine content in excess of the levels set out above may exhibit extreme increases in viscosity which would render such hydrocarbons unworkable and therefore unusable as plasticizers in sealant formulations.

Viscosity of the improved chlorinated hydrocarbons may vary, but must be low enough so that the hydrocarbons may be readily handled and processed for use as a sealant plasticizer in a variety of polysulfide rubber sealant formulations which may vary widely in composition due to the incorporation of particular additives to suit the particular application for which the sealant formulation is intended. In general, the viscosity of the improved chlorinated hydrocarbons is below about 25,000 centipoises at 25° C. Preferably, the viscosity is below about 15,000 centipoises at 25° C., and most preferably below about 10,000 centipoises at 25° C. In general the viscosity of a particular carbon number paraffin chlorinated to a particular chlorine content is higher than the viscosity of the same carbon number alpha-olefin chlorinated to the same chlorine content.

The chlorination reaction is carried out preferably at a temperature of from about 25° to 130° C., and most preferably at a temperature of from about 70° to about 120° C. Chlorine is reacted with the hydrocarbon by way of addition and substitution reactions with hydrogen chloride being formed as a by-product. If desired, the chlorination reaction initially may be carried out at a temperature of from about 25° to about 65° C. and subsequently elevated to from about 90° to 125° C. during the latter stages of the reaction. The chlorination is preferably carried out at substantially atmospheric pressure; however, slightly elevated pressures may be utilized. Chlorine preferably continuously is introduced into the hydrocarbon as a gas. The rate of chlorine introduction is preferably adjusted so as to approximate the rate of reaction attainable, and can be decreased should the rate of reaction become excessive, or increased should the rate of reaction become too low. The hydrocarbon undergoing chlorination is preferably stirred or otherwise agitated throughout the reaction.

The chlorination process of the present invention may be carried out in the presence of light to catalyze the reaction, although a catalyst may not be necessary in other instances. Other catalysts such as Lewis acid catalysts, e.g., aluminum chloride and boron trifluoride, may also be used.

If desired, the use of a catalytic light source may be deferred until a significant degree of chlorination is achieved e.g., until the product contains about 40% to about 50% chlorine.

Conventional actinic light sources commonly used in photochemical reactions may be selected from the following: fluorescent lamps, tungsten filament lamps, ordinary light bulbs, mercury vapor arc lamps such as a Hanovia light, and ultraviolet lamps. The light source may be placed directly inside the reactor, or next to an external recycling line through which the reactants circulate. Light wave lengths of below about 3000 angstrom units may produce harmful decomposition or an otherwise inferior product. Such wave lengths should be avoided and may be filtered out or eliminated as disclosed in U.S. Pat. Nos. 2,403,179 and 2,929,369, which are incorporated herein by reference.

Chlorine content as used herein refers to the amount of chlorine chemically fixed or bonded to the hydrocarbon molecules and not to any free chlorine or the chlorine content of any chlorinated solvent remaining in the chlorinated hydrocarbon material. Chlorine content can be conveniently measured by a Schoniger oxygen flask technique, e.g., ASTM Test Designation D 1638-59T (Method B) (pp. 107-109) which is incorporated herein by reference, and which was modified to include 0.05 g. of test sample instead of 0.02 g. and a 0.025 N silver nitrate solution instead of 0.01 N solution.

If desired, an additive capable of overcoming trace amounts of iron contamination optionally may be provided in the reaction zone in accordance with the teachings of our commonly assigned U.S. Pat. No. 3,567,610, which is herein incorporated by reference.

The chlorination reaction may be terminated, e.g., by ceasing chlorine introduction when the desired degree of chlorination has been reached. The progress of the chlorination reaction may be simply monitored, e.g., by the periodic withdrawal of a sample followed by a specific gravity determination. For a further discussion of hydrocarbon chlorination techniques in general, see U.S. Pat. Nos. 3,896,183 and 3,919,338 which are incorporated herein by reference.

The polysulfide polymers which may be employed in the present invention and the process for their preparation are generally described, e.g., in *Rubber Chemistry and Technology*, Vol. 41, No. 1, February 1969, pages 115-160 which is herein incorporated by reference. They include, e.g., thiol-terminated liquid polymers. They may be advantageously formed from a bis(2-chloroethyl) formal monomer and have molecular weights ranging from about 600 to about 80,000. Polysulfide polymers with a molecular weight of about 4,000, e.g., THIOKOL® LP-2 and THIOKOL® LP-32 polysulfide polymers, are readily available on a commercial basis and thus constitute a particularly advantageous source of thiol-terminated liquid polysulfide polymers.

The sealant formulations of the present invention may also contain a variety of materials commonly employed as additives such as fillers, extenders, plasticizers, pigments, adhesion promoters, curing systems, retarding agents and the like as described, e.g., in *Rubber Chemistry and Technology*, Vol. 41, No. 1, February 1969, pages 115-160.

The improved chlorinated hydrocaron of the invention may be incorporated into the formulations in amounts ranging from about 10 to about 100 parts by weight, and preferably from about 20 to about 75 parts by weight per 100 parts by weight of polysulfide polymer.

The fillers or extenders which may be incorporated into the compositions of the present invention include, e.g., carbon black, various clays, titanium dioxide and calcium carbonate. Such fillers or extenders may be incorporated in amount ranging from about 25 to about 150 parts by weight and preferably from about 50 to about 100 parts by weight of filler or extender per 100 parts by weight of polysulfide polymer.

The pigments contemplated may include, e.g., aluminum powder and lithopone (a composite pigment of zinc sulfide and barium sulfate). Several of the above compositions, e.g., carbon black and titanium dioxide, may function both as a filler or extender and as a pigment. When both a filler and a pigment are incorporated into the polysulfide sealant formulation, from about 0.1 to about 40 parts by weight, preferably about 0.1 to about 20 parts by weight of pigment per 100 parts of polysulfide polymer.

The retarding agents contemplated may include, e.g., most fatty acids. Stearic acid, which is a widely available substance, is particularly preferred as a retarding agent. The amount of retarding agent present is a function of the particular curing system selected. Generally, the retarding agent is present in an amount from about 0.01 to about 1.0 parts by weight, preferably about 0.01 to about 0.5 parts by weight of retarding agent per 100 parts of polysulfide polymer.

The amount and type of additive employed in the sealant formulation of the present invention may be varied to suit the particular application for which the sealant formulation is intended.

Curing or oxidizing agents which may be incorporated into the sealant compositions of the present invention in an amount effective to cure the compositions are described in detail in *Rubber Chemistry and Technology*, Vol. 41, No. 1, February, 1969, pages 115-160 and include e.g., lead and manganese oxides (e.g., lead dioxide or manganese dioxide), metallic peroxides (e.g., calcium peroxide or zinc peroxide), or organic compositions such as epoxy resins and certain peroxides.

The curing or oxidizing agent is present in the formulation in an amount of from about 5 to about 12 parts by weight, preferably from about 7 to about 10 parts by weight, per 100 parts of polysulfide polymer.

The curing or oxidizing agents may also be combined with a carrier or plasticizer such as an ester-type carrier, e.g., a phthalate ester, or a plasticizer such as the chlorinated hydrocarbon employed in the present invention to form a curing system, so long as the carrier does not detrimentally react with the curing or oxidizing agents. When a carrier is present, the curing system is a paste in which the curing or oxidizing agent is mixed or dispersed in the carrier by ball milling, paint milling or sigma-blade mixing.

When a carrier is used, the curing system generally contains from about two to about eight parts by weight, preferably about five parts by weight, of curing or oxidizing agent per ten parts of curing system. The remainder is substantially carrier, which generally should be present in an amount effective to disperse or mix the curing agent.

It is possible to directly incorporate the curing or oxidizing agent into the polysulfide polymer in a dry state, without employing a carrier.

The improved sealant formulation of the present invention may be incorporated into a multi-pane or thermal pane insulating window structure directly when the structure is assembled. It is also possible to extrude the sealant formulation into strips to be incorporated into the window structure at a later time.

EXAMPLE I

For Runs No. 1-25, a variety of hydrocarbon feeds were provided to be chlorinated to various levels of chlorine content by the process as described above. In most cases, about 300-400 grams of alpha-olefin or normal paraffin was charged to a glass reactor vessel equipped with a temperature sensing means, sparger, sealed agitator and condensor. The reactions were carried out under ambient lighting conditions.

Each feed was heated with agitation to 85° C. and chlorine bubbled into the mixture. For the alpha-olefins, reaction was immediate and the temperature was allowed to surge to 100°-110° C. For the normal paraffin reaction, chlorine was added at 85° C. with heating continually applied until this reaction mixture reached 95° C.-105° C. (this will vary as function of the chain length of the feed hydrocarbon) at which point the reaction started. Chlorine addition was continued while maintaining temperature generally at 110°±10° C. until the required amount of chlorine had been added. Each product was then cooled and air blown for about ½ hour while maintaining the temperature in the range of 70°-95° C. The product was neutralized in a conventional manner and air blowing continued for 15 additional minutes at the above temperatures. The products were all stabilized with a conventional stabilizer.

The chlorinated hydrocarbons obtained are described below in Table I.

For run 3, which is within the scope of this invention, the chlorination procedure of U.S. Pat. No. 3,896,183 was followed. Runs 1-2 and 4-7 are also within the scope of this invention.

In runs 8-25, various plasticizers were selected for comparison purposes. Those samples are described below in Table I.

The hydrocarbon feed stream employed in runs 1,2 and 3 essentially of a $C_{15}$ normal paraffin. The feed stream included about 3-5 weight percent $C_{14}$ normal paraffin, about 13 weight percent $C_{16}$ normal paraffin, about 3 weight percent $C_{17-18}$ normal paraffin and about 0.1 weight percent of paraffins below $C_{14}$.

TABLE I

Chlorinated Liquid Hydrocarbon and Comparison Samples

| Run No. | Nature of Feed | Actual Weight Percent Chlorine Content | (Estimated Weight Percent Chlorine Content) | Viscosity-Centipoises at 25° C. | Fog Test[2] | Heat Loss-weight percent after 24 hours at 105° C. | Compatibility |
|---|---|---|---|---|---|---|---|
| 1 | $C_{15}$ normal paraffin | 54.1 | | 6200 | passed(4) | −0.14 | Not available |
| 2 | $C_{15}$ normal paraffin | 56.9 | | 15,620 | passed(4) | −0.18 | Not available |
| 2a | Blend (a)-42% $C_{20}$-olefin 36% $C_{22}$α-olefin and 7% $C_{24}$α-olefin (chlorinated to 51.9 weight percent) and (b) 15% $C_{12}$ n-paraffin (chlorinated to 58%) | — | 52.8 | 16,320 | passed(1) | −0.40 | Not available |
| 3 | $C_{15}$ normal paraffin | 53.8[6] | | 4860[5] | passed(1) | −0.24 | clear[4] |
| 4 | $C_{18}$ normal paraffin | 50.8 | 50.5 | 4490 | passed(4) | −0.06 | clear[4] |
| 5 | $C_{22}$ normal paraffin | 50.5 | 50.4 | 21,400 | passed(4) | −0.06 | clear[4] |
| 6 | blend (a) 25% $C_{14}$n-paraffin and 25% $C_{14}$ α-olefin, (blended & chlorinated to 57.9 weight percent chlorine); and (b) 50% $C_{22}$ n-paraffin (chlorinated to 50.5 weight percent) | — | 54.2 | 16,120 | passed(2) | −0.11 | clear[4] |
| 7 | blend-50% $C_{14}$ n-paraffin; 50% $C_{14}$ α-olefin | 57.8 | 57.8 | 11,573 | passed(1) | −0.12 | clear[4] |
| 8 | $C_{14}$ normal paraffin[1] | 49.6 | 49.4 | 404 | failed | −0.95 | clear[4] |
| 9 | $C_{14}$ normal paraffin[1] | 52.6 | 52.4 | 976 | failed | −0.56 | clear[4] |

TABLE I-continued

Chlorinated Liquid Hydrocarbon and Comparison Samples

| Run No. | Nature of Feed | Actual Weight Percent Chlorine Content | (Estimated Weight Percent Chlorine Content) | Viscosity-Centipoises at 25° C. | Fog Test[2] | Heat Loss-weight percent after 24 hours at 105° C. | Compatibility |
|---|---|---|---|---|---|---|---|
| 10 | $C_{14}$ alpha-olefin[1] | 52.6 | 52.4 | 824 | failed | −0.57 | clear[4] |
| 11 | $C_{14}$ alpha-olefin[1] | 63.2 | 63.5 | 397,500 | passed(4) | −0.05 | clear[4] |
| 12 | $C_{14}$ normal paraffin[1] | 63.4 | 63.3 | 617,000 | passed(4) | −0.05 | clear[4] |
| 13 | blend-50% $C_{12}$ n-paraffin; 50% $C_{12}$ α-olefin[1] | 52.8 | 52.5 | 243 | failed | −4.54 | clear[4] |
| 15 | $C_{12}$ alpha-olefin[1] | 57.9 | 57.8 | 1770 | failed | −1.03 | clear[4] |
| 16 | blend-50% $C_{12}$ n-paraffin; 50% $C_{12}$ α-olefin[1] | 63.2 | 63.1 | 30,240 | failed | −0.29 | clear[4] |
| 17 | $C_{12}$ alpha-olefin[1] | 59.1 | 58.7 | 2755 | failed | −0.57 | clear[4] |
| 18 | Blend-(a) 25% $C_{16}$ n-paraffin and 25% $C_{16}$ olefin, (chlorinated to 63.7 weight %); and (b) 25% $C_{12}$ n-paraffin and 25% $C_{12}$ α-olefin (chlorinated to 52.8 weight percent)[1] | — | 58.3 | 5820 | failed | −2.165 | clear[4] |
| 19 | Blend-(a) 50% $C_{16}$ -α-olefin (chlorinated to 57.8 weight percent); and (b) 50% $C_{12}$α-olefin (chlorinated to 57.9 weight percent)[1] | — | 57.9 | 7200 | failed | −0.55 | clear[4] |
| 20 | UNICHLOR® 50 L 50 ($C_{10}$–$C_{13}$ paraffin)[1] | 52.8 | (50) | 543 | failed | −13.40 | not tested |
| 21 | UNICHLOR® 60 L 60 ($C_{10}$–$C_{12}$ paraffin)[1] | 59.0 | (60) | 1750 | failed | −5.40 | not tested |
| 22 | SANTICIZER®278 (phthalate ester)[1] | none | none | 663 | failed | not tested | not tested |
| 23 | TOYOPARAX-145 (paraffin)[1] | 44.8 | Not available | 179 | failed | −2.24 | cloudy[3] |
| 24 | TOYOPARAX-150 (paraffin)[1] | 50.8 | Not available | 1227 | failed | −0.47 | clear[3] |
| 25 | CERECLOR S-52 (paraffin)[1] | 50.8 | Not available | 1185 | failed | −0.49 | clear[3] |

[1]Denotes comparison run outside the scope of this invention.
[2]"Failed" denotes failure during initial 24-hour period. Figure in ( ) denotes number of days after which material passed fog test.
[3]Tested only at 1/1 ratio of polysulfide to chlorinated hydrocarbon.
[4]Tested at 1/1, 3/1 and 1/3 ratios of polysulfide to chlorinated hydrocarbon.
[5]Data reported represents average of three determinations
[6]Data reported represents average of four determinations.

Following the chlorination procedure used for most of the samples described above, several additional comparison samples, also outside the scope of the invention, were prepared. All these samples were prepared from feeds of a particularly high purity of over 96.0 mole percent with a maximum content of less than 1.0 mole percent of the next lower hydrocarbon with an even number of carbon atoms per molecule. The samples are described below in Table II as Runs 26-33.

EXAMPLE II

Fog tests were performed on all the samples, the results of which are set forth in Tables I and II.

In these tests, a large test tube containing 75 grams of a sample plasticizer and 50 ml. of glass beads (for weighting purposes and level control) was prepared for each sample. The test tubes were corked with a stopper having an aperture in the center and a small test tube was placed snugly through the aperture. These small test tubes acted as an air-cooled cold finger type con-

TABLE II

ADDITIONAL CHLORINATED LIQUID HYDROCARBON SAMPLES

| Run No. | Nature of Feed | Actual Weight Percent Chlorine Content | (Estimated Weight Percent Chlorine Content) | Viscosity-Centipoises at 25° C. | Fog[2] Test | Heat Loss-Weight Percent after 24 hours at 105° C. | Compatibility |
|---|---|---|---|---|---|---|---|
| 26 | $C_8$ Normal Paraffin[1] | 44.0 | (45) | 8.1 | Failed | −96.6 | Clear[4] |
| 27 | $C_8$ Normal Paraffin[1] | 55.3 | (55) | 20 | Failed | −82.0 | Clear[4] |
| 28 | $C_{10}$ Normal Paraffin[1] | 47.2 | (45) | 21 | Failed | −44.10 | Clear[4] |
| 29 | $C_{10}$ Normal paraffin[1] | 54.4 | (55) | 134 | Failed | −14.98 | Clear[4] |
| 30 | $C_{12}$ Normal Paraffin[1] | 43.9 | (45) | 40 | Failed | −13.00 | Cloudy[3,4] |
| 31 | $C_{12}$ Normal Paraffin[1] | 54.2 | (55) | 679 | Failed | −1.70 | Clear[4] |
| 32 | $C_{14}$ Normal Paraffin[1] | 45.4 | (45) | 157 | Failed | −1.86 | Cloudy[3,4] |
| 33 | $C_{14}$ Normal Paraffin[1] | 54.2 | (55) | 3,824 | Failed | +0.09 | Clear[4] |

[1]Denotes comparison run outside the scope of this invention.
[2]Samples tested at about 77° C.
[3]Solution visibly clouded.
[4]Tested only at 1/1 ratio of polysulfide to chlorinated hydrocarbon.

denser, providing a surface on which any volatilized material might deposit. The double test tube arrangement was partially immersed in a hot oil bath kept at a temperature of from about 71° C. to about 77° C., such that the temperature of the upper tube was about 42° C. to about 49° C. The chlorinated hydrocarbons of the invention were all non-fogging after at least one day, with several being non-fogging after at least two, three or four days.

EXAMPLE III

Most of the samples were tested to determine heat loss values. Each sample was exposed to an elevated temperature of about 105° C. for a period of about 24 hours. The results appear in Tables I and II.

As may be seen from these results, all of the chlorinated hydrocarbons within the scope of this invention and subsequently subjecting the mixtures to several passes on a three-roll paint mill. The sealant composition and curing paste were then blended in the proportions shown until a uniform color was obtained. After blending, the sealant formulation was press-cured overnight at room temperature (about 25° C.) in a standard ASTM cavity mold and subsequently aged for seven days.

After curing and aging, performance tests were carried out on the sealant formulations to determine the compatibility of the sample plasticizers with the polysulfide rubber and the stability of the formulations.

To determine the stability of the cured polysulfide rubber sealant formulation, the formulation was subjected to an elevated temperature of about 70° C. for a period of about 24 hours. Weight loss measurements were taken, and are reported in Table III:

TABLE III

Weight Loss Measurements in Cured Formulations

| Run No. | Nature of Feed | Actual Weight Percent Chlorine Content | (Estimated Weight Percent Chlorine Content) | Weight % Loss of Plasticizer[1,2] |
|---|---|---|---|---|
| 3 | $C_{15}$ normal paraffin | 53.8[4] | | −2.83 |
| 20 | UNICHLOR® 50 L 50 ($C_{10}$–$C_{13}$ paraffin)[3] | 52.8 | (50) | −7.35 |
| 21 | UNCHLOR® 60 L 60 ($C_{10}$–$C_{12}$ paraffin)[3] | 59.0 | (60) | −5.35 |
| 22 | SANTICIZER® 278 (phthalate ester)[3] | 0.0 | (0) | −4.34 |
| 23 | TOYOPARAX-145 (paraffin)[3] | 44.8 | Not available | −5.06 |
| 24 | TOYOPARAX-150 (paraffin)[3] | 50.8 | Not available | −3.49 |
| 25 | CERECLOR S-52 (paraffin)[3] | 50.8 | Not available | −3.90 |

[1]Based on total weight of plasticizer and sealant formulation.
[2]Performed in accordance with ASTM Test Designation D 1203-67.
[3]Denotes comparison run outside the scope of this invention.
[4]Denotes average of four determinations.

are stable and non-volatile products which are not subject to significant heat loss, i.e., maintain a heat loss value of less than 0.5 weight percent in a period of about 24 hours.

EXAMPLE IV

The plasticizer samples of Runs 3 and 20–25 were incorporated into a polysulfide rubber sealant formulation and the performance of the sealant formulations incorporating each of the sample plasticizers was determined. Run 3 is within the scope of this invention and Runs 20–25 are for comparison purposes. The sealant composition and curing paste used to prepare the various sample formulations are described below:

| Ingredient | Parts by Weight |
|---|---|
| Sealant Composition | |
| THIOKOL® LP-2 Polysulfide polymer[1] | 50 |
| THIOKOL® LP-32 Polysulfide polymer[2] | 50 |
| Sample Chlorinated Liquid Hydrocarbon | 25 |
| Filler (Keystone White-Calcium Carbonate) | 45 |
| Pigment (titanium dioxide) | 15 |
| Retarding Agent (Stearic Acid) | 0.2 |
| Total | 185.2 |
| Curing Paste | |
| Plasticizer (SANTICIZER® 278-phthalate ester) | 7.5 |
| Catalyst (lead dioxide-$PbO_2$) | 7.5 |
| Total | 15.0 |

The sealant composition and curing paste were compounded separately by mixing the necessary ingredients As can be seen from this data, the polysulfide rubber formulations of this invention, namely Run No. 3, was satisfactory and showed excellent stability, with less than 5.0 weight percent loss.

EXAMPLE V

The cured formulations of Runs 3 and 20–25 were stored for one week at a constant temperature of about 27° C. and 50% relative humidity and were subjected to additional physical property tests.

It may be seen from this data that Run No. 3 within the scope of the invention, when compared, e.g., to the commercially acceptable plasticizer of Run 22 performs effectively, as shown in Table IV.

TABLE IV

ADDITIONAL PHYSICAL PROPERTIES OF THE CURED SEALANT FORMULATIONS

| Run No.[3] | 300% Modulus[1] (PSI) | Tensile Strength Max[1] (PSI) | Elongation[1] % | Hardness Shore[2] |
|---|---|---|---|---|
| 3 | 77 | 90.0 | 420 | 26.0 |
| 20 | 4 | 94.0 | 270 | 27.0 |
| 21 | 113 | 118.0 | 340 | 31.0 |
| 22 | 97.9 | 114.0 | 485 | 27.0 |
| 23 | 52 | 78.0 | 315 | 25.0 |
| 24 | — | 79.0 | 285 | 27.0 |

TABLE TV-continued
ADDITIONAL PHYSICAL PROPERTIES OF THE CURED SEALANT FORMULATIONS

| Run No.[3] | 300% Modulus[1] (PSI) | Tensile Strength Max[1] (PSI) | Elongation[1] % | Hardness Shore[2] |
|---|---|---|---|---|
| 25 | 82 | 89.0 | 355 | 26.0 |

[1] Test performed in accordance with ASTM Test Designation D-412-68, herein incorporated by reference.
[2] Test performed in accordance with ASTM Test Designation D-2240-75, herein incorporated by reference. A Shore A-2 durometer was used.
[3] For details of Runs, See Table I.
[4] Failed before reaching 300% modulus

EXAMPLE VI

To determine the compatibility of the sample chlorinated hydrocarbons in "green" or uncured polysulfide rubber, equal volume parts of the chlorinated hydrocarbons of Runs No. 1-19 and 23-33 and THIOKOL ® LP-2 rubber were mixed in solution and maintained at room temperature (about 25° C.) for about 18 hours and the following results were obtained. A "clear" solution would be indicative of a high or acceptable level of compatibility. A "cloudy" solution is one which is visibly clouded and represents an unacceptable level of compatibility. Those solutions which were "incompatible" were separated into two visibly distant layers. The results of the "green" compatibility test are set forth in Tables I and II above.

As may be seen from Tables I and II, for the paraffins having a low number of carbon atoms per molecule, e.g., $C_8$-$C_{10}$ paraffins, a 45 weight percent chlorine content appears sufficient to provide the necessary compatibility, but these all have a volatility which is extremely high and which would result in extensive fogging. As the number of carbon atoms increases to, e.g., 12 or 14, the 45 weight percent chlorine content becomes insufficient to provide the compatible formulation, the volatility is again so high as to result in fogging. The improved chlorinated hydrocarbons of the invention, on the other hand, exhibit excellent compatibility without suffering from undesirable fogging.

Thus, the improved chlorinated hydrocarbons of the invention combine a high compatibility of polysulfide rubber sealant compositions with a volatility low enough to avoid fogging and a viscosity low enough to provide ease in handling to produce a plasticizer which is subject to very low heat loss and which results in a stable polysulfide rubber sealant formulation when blended therein.

Although the invention has been described with preferred embodiments, it is to be understood that variations and modifications may be resorted to as will be apparent to those skilled in the art. Such variations and modifications are considered to be within the purview and the scope of the claims appended hereto.

I claim:
1. An improved polysulfide rubber sealant formulation comprising
   a liquid polysulfide polymer; and
   a chlorinated hydrocarbon plasticizer in an amount effective to plasticize said polysulfide polymer and consisting essentially of a chlorinated hydrocarbon selected from chlorinated paraffins containing from 14 to about 15 carbon atoms per molecule, chlorinated alpha-olefins containing from 14 to about 15 carbon atoms per molecule, and blends thereof; the chlorine content of the chlorinated hydrocarbon ranging from 50 to 59 weight percent; the chlorinated hydrocarbon plasticizer having a combination of (a) number of carbon atoms per molecule and (b) chlorine content sufficient to provide a non-fogging and compatible plasticizer in a polysulfide rubber sealant formulation; the chlorinated hydrocarbon plasticizer having a viscosity of less than about 25,000 centipoises at 25° C. and having a heat loss value of less than about 0.5 weight percent;
   and the polysulfide rubber sealant formulation being stable when cured.

2. The improved polysulfide rubber sealant formulation of claim 1 wherein the chlorinated hydrocarbon is a chlorinated paraffin containing 15 carbon atoms per molecule; the chlorine content of the chlorinated paraffin ranging from 52 to 56 weight percent; wherein the chlorinated hydrocarbon plasticizer has a viscosity of less than about 15,000 centipoises at 25° C.; and wherein the liquid polysulfide polymer is thiol-terminated.

3. The improved polysulfide rubber sealant formulation of claim 2 wherein the chlorinated hydrocarbon plasticizer has a viscosity of less than about 10,000 centipoises at 25° C.

4. An improved polysulfide rubber sealant formulation comprising
   a liquid polysulfide polymer;
   a chlorinated hydrocarbon plasticizer in an amount effective to plasticize said polysulfide polymer and selected from chlorinated paraffins containing from 14 to about 15 carbon atoms per molecule and chlorinated alpha-olefins containing from 14 to about 15 carbon atoms per molecule and blends thereof; the chlorine content of the chlorinated hydrocarbon ranging from 50 to 59 weight percent; the chlorinated hydrocarbon plasticizer having a viscosity of less than about 25,000 centipoises at 25° C., a heat loss value of less than about 0.5 weight percent and a combination of (a) number of carbon atoms per molecule and (b) chlorine content sufficient to provide a non-fogging and compatible plasticizer in a polysulfide rubber sealant formulation;
   a pigment;
   a retarding agent; and
   a filler;
   the polysulfide rubber sealant formulation being stable when cured, the curing being effected by the incorporation of an effective amount of curing agent.

5. The improved polysulfide rubber sealant formulation of claim 4 wherein the formulation comprises about 100 parts by weight of a thiol-terminated polysulfide polymer;
   from about 10 to 100 parts by weight of a chlorinated hydrocarbon plasticizer consisting essentially of a chlorinated paraffin containing 15 carbon atoms per molecule; the chlorine content of the chlorinated paraffin ranging from 52 to 56 weight percent; the chlorinated hydrocarbon plasticizer having a viscosity of less than about 15,000 centipoises at 25° C.;
   from about 0.1 to about 40 parts by weight of a pigment;
   from about 0.01 to about 1.0 parts by weight of a retarding agent; and from about 25 to about 150 parts by weight of a filler; and wherein the curing is effected by the incorporation of from about 5 to about 12 parts by weight of a curing agent.

6. The improved polysulfide rubber sealant formulation of claim 5 wherein the formulation comprises
from about 20 to about 75 parts by weight of said chlorinated hydrocarbon plasticizer;
from about 0.1 to about 20 parts by weight of a pigment;
from about 0.01 to about 0.5 parts by weight of a stearic acid retarding agent; and
from about 50 to about 100 parts by weight of a filler;
wherein the chlorinated hydrocarbon plasticizer has a viscosity of less than 10,000 centipoises at 25° C.; and wherein the curing is effected by the incorporation of from about 7 to about 10 parts by weight of curing agent and an equal amount of a carrier.

7. A method for preparing an improved polysulfide rubber sealant formulation comprising mixing together the liquid polysulfide polymer and chlorinated hydrocarbon plasticizer of claim 1.

8. A method for preparing an improved polysulfide rubber sealant formulation comprising mixing together the liquid polysulfide polymer and the chlorinated hydrocarbon plasticizer of claim 2.

9. A method for preparing an improved polysulfide rubber sealant formulation comprising mixing together the liquid polysulfide polymer and the chlorinated hydrocarbon plasticizer of claim 3.

10. A method for preparing the improved polysulfide rubber sealant formulation of claim 4 comprising chlorinating a hydrocarbon selected from paraffins containing from 14 to about 15 carbon atoms per molecule and alpha-olefins containing from 14 to about 15 carbon atoms per molecule or blends thereof to a chlorine content ranging from 50 to 59 weight percent; mixing the chlorinated hydrocarbon together with a liquid polysulfide polymer, a pigment, a retarding agent and a filler to form a polysulfide rubber sealant formulation and curing the polysulfide rubber sealant formulation by incorporating an effective amount of a curing agent.

11. A method for preparing the improved polysulfide rubber sealant formulation of claim 5 comprising chlorinating a hydrocarbon consisting essentially of a paraffin containing 15 carbon atoms per molecule to a chlorine content ranging from 52 to 56 weight percent; mixing from about 10 to about 100 parts by weight of the chlorinated paraffin together with about 100 parts by weight of a liquid polysulfide polymer, from about 25 to about 100 parts by weight of a filler, from about 0.01 to about 1.0 parts by weight of a retarding agent and from about 0.1 to about 40 parts by weight of a pigment to form a polysulfide rubber sealant formulation; and curing the polysulfide rubber sealant formulation by incorporating from about 5 to about 12 parts by weight of a curing agent.

12. A method for preparing the improved polysulfide rubber sealant formulation of claim 6 comprising chlorinating a hydrocarbon consisting essentially of a paraffin containing 15 carbon atoms per molecule to a chlorine content ranging from 52 to 56 weight percent; mixing from about 20 to about 75 parts by weight of the chlorinated paraffin together with about 100 parts by weight of a liquid polysulfide polymer, from about 50 to about 100 parts by weight of a filler, from about 0.01 to about 0.5 parts by weight of a stearic acid retarding agent and from about 0.1 to about 20 parts by weight of a pigment to form a polysulfide rubber sealant formulation; and curing the polysulfide rubber sealant formulation by incorporating from about 7 to about 10 parts by weight of a curing agent and an equal amount of a carrier.

13. An improved polysulfide rubber sealant formulation comprising
a liquid polysulfide polymer; and
a chlorinated hydrocarbon plasticizer in an amount effective to plasticize said polysulfide polymer and consisting essentially of a chlorinated hydrocarbon selected from chlorinated paraffins containing from 14 to 22 carbon atoms per molecule, chlorinated alpha-olefins containing from 14 to 22 carbon atoms per molecule, and blends thereof; the chlorine content of the chlorinated hydrocarbon ranging from 50 to about 51 weight percent; the chlorinated hydrocarbon plasticizer having a combination of (a) number of carbon atoms per molecule and (b) chlorine content sufficient to provide a non-fogging and compatible plasticizer in a polysulfide rubber sealant formulation; the chlorinated hydrocarbon plasticizer having a viscosity of less than about 25,000 centipoises at 25° C. and a heat loss value of less than about 0.5 weight percent; and the polysulfide rubber sealant formulation being stable when cured.

14. An improved polysulfide rubber sealant formulation comprising
a liquid polysulfide polymer;
a chlorinated hydrocarbon plasticizer in an amount effective to plasticize said polysulfide polymer and consisting essentially of a chlorinated hydrocarbon selected from chlorinated paraffins containing from 14 to 22 carbon atoms per molecule, chlorinated alpha-olefins containing from 14 to 22 carbon atoms per molecule, and blends thereof; the chlorine content of the chlorinated hydrocarbon ranging from 50 to about 51 weight percent; the chlorinated hydrocarbon plasticizer having a viscosity of less than about 25,000 centipoises at 25° C., a heat loss value of less than about 0.5 weight percent and a combination of (a) number of carbon atoms per molecule and (b) chlorine content sufficient to provide a non-fogging and compatible plasticizer in a polysulfide rubber sealant formulation;
a pigment;
a retarding agent; and
a filler;
the polysulfide rubber sealant formulation being stable when cured, the curing being effected by the incorporation of an effective amount of a curing agent.

15. The improved polysulfide rubber sealant formulation of claim 14 wherein the formulation comprises
100 parts by weight of a thiol-terminated polysulfide polymer;
from about 10 to about 100 parts by weight of a chlorinated hydrocarbon plasticizer selected from chlorinated paraffins containing from 14 to 22 carbon atoms per molecule, chlorinated alpha-olefins containing from 14 to 22 carbon atoms per molecule, and blends thereof; the chlorinated hydrocarbon plasticizer having a viscosity of less than about 15,000 centipoises at 25° C.;
from about 0.1 to about 40 parts by weight of a pigment;
from about 0.01 to about 1.0 parts by weight of a retarding agent; and from about 25 to about 50 parts by weight of a filler; and wherein the curing is effected by the incorporation of from about 5 to about 12 parts by weight of a curing agent.

16. The improved polysulfide rubber sealant formulation of claim 15 wherein the formulation comprises from about 20 to about 75 parts by weight of said chlorinated hydrocarbon plasticizer; from about 0.1 to about 20 parts by weight of a pigment;
from about 0.01 to a about 0.5 parts by weight of a stearic acid retarding agent; and
from about 50 to about 100 parts by weight of a filler; wherein the chlorinated hydrocarbon plasticizer has a viscosity of less than about 10,000 centipoises at 25° C.; and wherein the curing is effected by the incorporation of from about 7 to about 10 parts by weight of a curing agent and an equal amount of a carrier.

17. A method for preparing an improved polysulfide rubber sealant formulation comprising mixing together the liquid polysulfide polymer and chlorinated hydrocarbon plasticizer of claim 13.

18. A method for preparing the improved polysulfide rubber sealant formulation of claim 14 comprising chlorinating a hydrocarbon selected from paraffins containing from 14 to 22 carbon atoms per molecule, alpha-olefins containing from 14 to 22 carbon atoms per molecule, and blends thereof to a chlorine content ranging from 50 to about 51 weight percent; mixing the chlorinated hydrocarbon together with a liquid polysulfide polymer, a pigment, a retarding agent and a filler to form a polysulfide rubber sealant formulation; and curing the polysulfide rubber sealant formulation by incorporating an effective amount of a curing agent.

19. A method for preparing the improved polysulfide rubber sealant formulation of claim 15 comprising chlorinating a hydrocarbon selected from paraffins containing from 14 to 22 carbon atoms per molecule, alpha-olefins containing from 14 to 22 carbon atoms per molecule, and blends thereof to a chlorine content ranging from 50 to about 51 weight percent; mixing from about 10 to about 100 parts by weight of the chlorinated hydrocarbon together with about 100 parts by weight of a liquid polysulfide polymer, from about 25 to about 150 parts by weight of a filler, from about 0.01 to about 1.0 parts by weight of a retarding agent and from about 0.1 to about 40 parts by weight of a pigment to form a polysulfide rubber sealant formulation; and curing the polysulfide rubber sealant formulation by incorporating from about 5 to about 12 parts by weight of a curing agent.

20. A method for preparing the improved polysulfide rubber sealant formulation of claim 16 comprising chorinating a hydrocarbon selected from the paraffins containing from 14 to 22 carbon atoms per molecule, alpha-olefins containing from 14 to 22 carbon atoms per molecule, and blends thereof to a chlorine content ranging from 50 to about 51 weight percent; mixing from about 20 to about 75 parts by weight of the chlorinated hydrocarbon together with about 100 parts by weight of a liquid polysulfide polymer, from about 50 to about 100 parts by weight of a filler, from about 0.01 to about 0.5 parts by weight of a stearic acid retarding agent and from about 0.1 to about 20 parts by weight of a pigment to form a polysulfide rubber sealant formulation; and curing the polysulfide rubber sealant formulation by incorporating from about 7 to about 10 parts by weight of a curing agent and an equal amount of a carrier.

21. An improved polysulfide rubber sealant formulation comprising a liquid polysulfide polymer and a chlorinated hydrocarbon plasticizer consisting essentially of a blend of chlorinated hydrocarbons selected from (a) chlorinated paraffins containing from 14 to about 15 carbon atoms per molecule, chlorinated alpha-olefins containing from 14 to about 15 carbon atoms per molecule, and blends thereof; and (b) chlorinated paraffins containing from about 21 to 22 carbon atoms per molecule, chlorinated alpha-olefins containing from about 21 to 22 carbon atoms per molecule and blends thereof; the chlorine content of the improved chlorinated hydrocarbon ranging from 50 to 59 weight percent; the chlorinated hydrocarbon plasticizer having a combination of (c) number of carbon atoms per molecule and (d) chlorine content sufficient to provide a non-fogging and compatible plasticizer in a polysulfide rubber sealant formulation; the chlorinated hydrocarbon plasticizer having a viscosity of less than about 25,000 centipoises at 25° C. and a heat loss value of less than about 0.5 weight percent; the chlorinated hydrocarbon plasticizer being present in an amount effective to plasticize said polysulfide polymer; the polysulfide rubber sealant formulation being stable when cured.

22. An improved polysulfide rubber sealant formulation comprising a liquid polysulfide polymer; a chlorinated hydrocarbon plasticizer consisting essentially of a blend of chlorinated hydrocarbons selected from (a) chlorinated paraffins containing from 14 to about 15 carbon atoms per molecule, chlorinated alpha-olefins containing from 14 to about 15 carbon atoms per molecule, and blends thereof; and (b) chlorinated paraffins containing from about 21 to 22 carbon atoms per molecule, chlorinated alpha-olefins containing from about 21 to 22 carbon atoms per molecule and blends thereof; the chlorine content of the improved chlorinated hydrocarbon ranging from 50 to 59 weight percent; the chlorinated hydrocarbon plasticizer having a combination of (c) number of carbon atoms per molecule and (d) chlorine content sufficient to provide a non-fogging and compatible plasticizer in a polysulfide rubber sealant formulation; the chlorinated hydrocarbon plasticizer having a viscosity of less than about 25,000 centipoises at 25° C. and a heat loss value of less than about 0.5 weight percent; the chlorinated hydrocarbon plasticizer being present in an amount effective to plasticize said polysulfide polymer; a pigment; a retarding agent; and a filler; the polysulfide rubber sealant formulation being stable when cured, the curing being effected by incorporation of an effective amount of curing agent.

23. A method for preparing an improved polysulfide rubber sealant formulation comprising mixing together a liquid polysulfide polymer and a chlorinated hydrocarbon plasticizer consisting essentially of a blend of chlorinated hydrocarbons selected from (a) chlorinated paraffins containing from 14 to about 15 carbon atoms per molecule, chlorinated alpha-olefins containing from 14 to about 15 carbon atoms per molecule, and blends thereof; and (b) chlorinated paraffins containing from about 21 to 22 carbon atoms per molecule, chlorinated alpha-olefins containing from about 21 to 22 carbon atoms per molecule and blends thereof; the chlorine content of the improved chlorinated hydrocarbon ranging from 50 to 59 weight percent; the chlorinated hydrocarbon plasticizer having a combination of (c) number of carbon atoms per molecule and (d) chlorine content sufficient to provide a non-fogging and compatible plasticizer in a polysulfide rubber sealant formulation;

the chlorinated hydrocarbon plasticizer having a viscosity of less than about 25,000 centipoises at 25° C. and a heat loss value of less than about 0.5 weight percent.

24. A method for preparing the improved polysulfide rubber sealant formulation comprising a liquid polysulfide polymer; a chlorinated hydrocarbon plasticizer consisting essentially of a blend of chlorinated hydrocarbons selected from (a) chlorinated paraffins containing from 14 to about 15 carbon atoms per molecule, chlorinated alpha-olefins containing from 14 to about 15 carbon atoms per molecule, and blends thereof; and (b) chlorinated paraffins containing from about 21 to 22 carbon atoms per molecule, chlorinated alpha-olefins containing from about 21 to 22 carbon atoms per molecule and blends thereof; the chlorine content of the improved chlorinated hydrocarbon ranging from 50 to 59 weight percent; the chlorinated hydrocarbon plasticizer having a combination of (c) number of carbon atoms per molecule and (d) chlorine content sufficient to provide a non-fogging and compatible plasticizer in a polysulfide rubber sealant formulation; the chlorinated hydrocarbon plasticizer having a viscosity of less than about 25,000 centipoises at 25° C. and a heat loss value of less than about 0.5 weight percent, the chlorinated hydrocarbon plasticizer being present in an amount effective to plasticize said polysulfide polymer; a pigment; a retarding agent; and a filler; the polysulfide rubber sealant formulation being stable when cured, the curing being effected by incorporation of an effective amount of curing agent, comprising chlorinating a composition consisting essentially of a blend of hydrocarbons selected from (a) paraffins containing from 14 to about 15 carbon atoms per molecule, alpha-olefins containing from 14 to about 15 carbon atoms, and blends thereof; and (b) paraffins containing from about 21 to 22 carbons per molecule, alpha-olefins containing from about 21 to 22 carbon atoms per molecule, and blends thereof to a chlorine content ranging from 50 to 59 weight percent; mixing the chlorinated hydrocarbons together with a liquid polysulfide polymer, a pigment, a retarding agent and a filler to form a polysulfide rubber sealant formulation; and curing the polysulfide rubber sealant formulation by incorporating an effective amount of a curing agent.

* * * * *